(12) United States Patent
Cabrera et al.

(10) Patent No.: US 7,975,426 B2
(45) Date of Patent: Jul. 12, 2011

(54) FISHING ROD HOLDER WITH AUTOMATIC PULL

(76) Inventors: Pedro Cabrera, Hialeah, FL (US); Gustavo Rivero, Hialeah, FL (US)

( * ) Notice: Subject to any disclaimer, the term of this patent is extended or adjusted under 35 U.S.C. 154(b) by 323 days.

(21) Appl. No.: 12/254,161

(22) Filed: Oct. 20, 2008

(65) Prior Publication Data

US 2010/0095579 A1    Apr. 22, 2010

(51) Int. Cl.
*A01K 97/10* (2006.01)
*A01K 97/11* (2006.01)

(52) U.S. Cl. ............................. 43/21.2; 43/15

(58) Field of Classification Search .............. 43/15, 16, 43/21.2
See application file for complete search history.

(56) References Cited

U.S. PATENT DOCUMENTS

| | | | | |
|---|---|---|---|---|
| 2,843,962 A * | 7/1958 | Porter | | 43/15 |
| 3,284,943 A * | 11/1966 | Wedel | | 43/15 |
| 4,188,742 A * | 2/1980 | Oulman | | 43/15 |
| 4,197,668 A * | 4/1980 | McKinsey | | 43/15 |
| 4,217,719 A * | 8/1980 | McDonnell | | 43/15 |
| 4,219,955 A * | 9/1980 | Lo Bosco | | 43/15 |
| 4,471,553 A * | 9/1984 | Copeland | | 43/15 |
| 4,476,645 A * | 10/1984 | Paarmann | | 43/15 |
| 5,570,534 A * | 11/1996 | Ford | | 43/19.2 |
| 6,094,851 A * | 8/2000 | Guidry | | 43/15 |
| 6,336,287 B1 * | 1/2002 | Lobato | | 43/16 |
| 7,316,094 B1 * | 1/2008 | Bishop | | 43/15 |
| 2006/0026891 A1 * | 2/2006 | Witt | | 43/15 |
| 2008/0134563 A1 * | 6/2008 | Gunter | | 43/16 |

* cited by examiner

*Primary Examiner* — David J Parsley
(74) *Attorney, Agent, or Firm* — Sanchelima & Associates, P.A.

(57) ABSTRACT

A fishing rod holder with automatic pull that operates unattended and automatically pulls when a force of predetermined magnitude is applied to the line. The holder includes a housing where an assembly for removably holding a fishing rod is pivotally mounted and movable between two extreme positions. The housing includes a stopper member cooperatively mounted outwardly to coact with the locking mechanism. A spring assembly biases the holder assembly towards the rearmost extreme position and a locking assembly for releasably holding the rod holder keeps the latter at the foremost extreme position. A trigger sensing the tension of the fishing line is automatically actuated by exceeding a predetermined tension magnitude causing it to pivot and transmit a rotational movement to an elongated member. The other end of the elongated member includes a spring biased retractable chamfered pin. The pin has a slanted termination and a flat termination. The slanted termination cammingly coacts with the stopper on the outside of the housing to overcome the spring biasing the pin. An anchorage assembly mounted to the housing permits the mounting of the device to a fixed object.

12 Claims, 4 Drawing Sheets

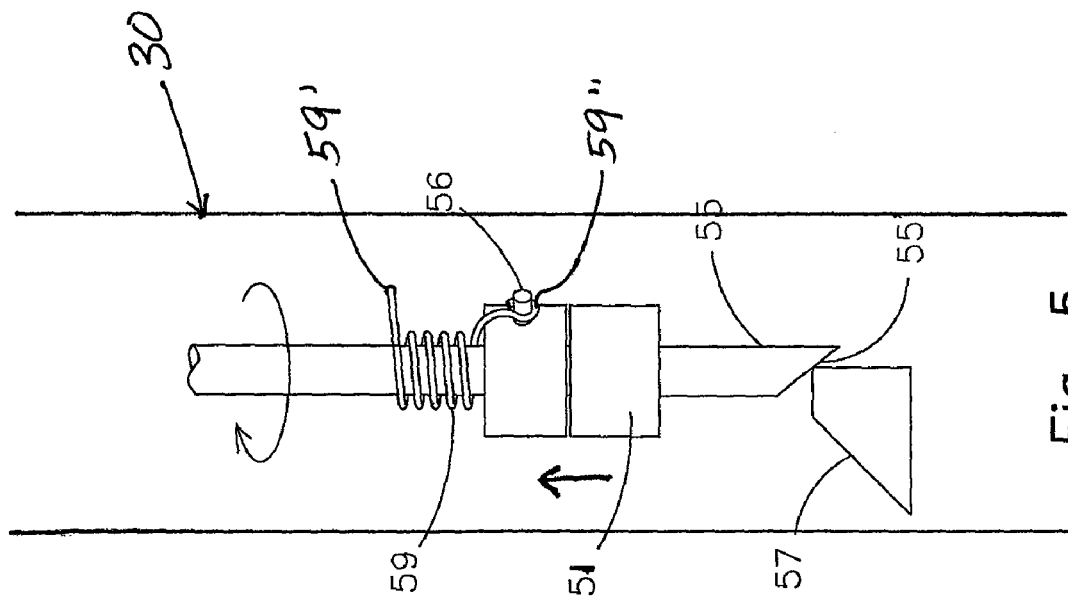
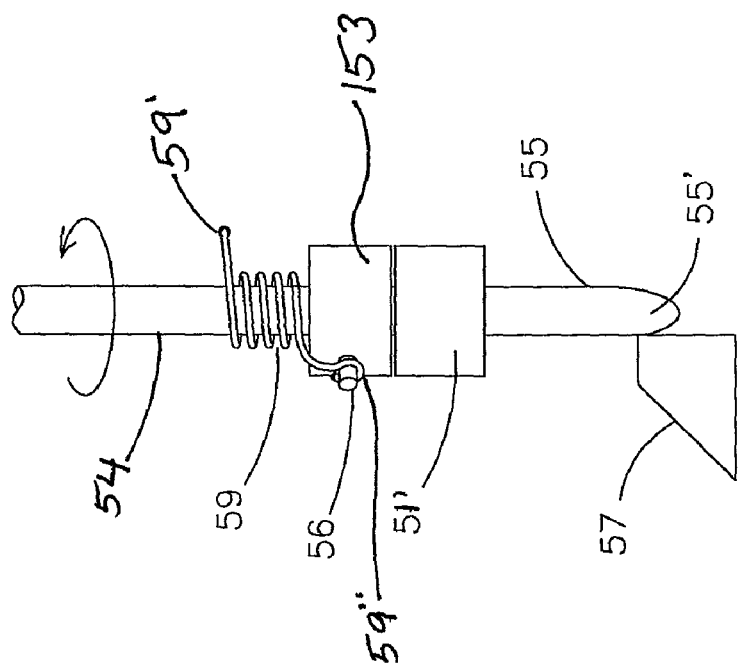
Fig. 4
Fig. 5

FISHING ROD HOLDER WITH AUTOMATIC PULL

BACKGROUND OF THE INVENTION

1. Field of the Invention

The present invention relates to fishing rod holder, and more particularly, to such a holder with an automatic pull.

2. Description of the Related Art

Several designs for fishing rods have been designed in the past. None of them, however, includes an automatic pull that is actuated responding to an alteration in the fishing line tension. This novel feature permits a user to leave a fishing rod unattended without missing the opportunity to hook the fish.

SUMMARY OF THE INVENTION

It is one of the main objects of the present invention to provide a fishing rod holder that automatically pulls the fishing line when a force of predetermined magnitude is applied to the line.

It is another object of this invention to provide an automatic fishing rod and holder that operates unattended.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a detail elevational view of a portion of lock assembly 50 showing spring member 59 and pin spring housing 58 with the pin's straight termination coacting with stopper 57, preventing dislodgement.

FIG. 5 is similar to FIG. 4, but with the chamfered termination coacting with stopper 57, allowing dislodgment.

DETAILED DESCRIPTION OF THE INVENTION

Figure 1:
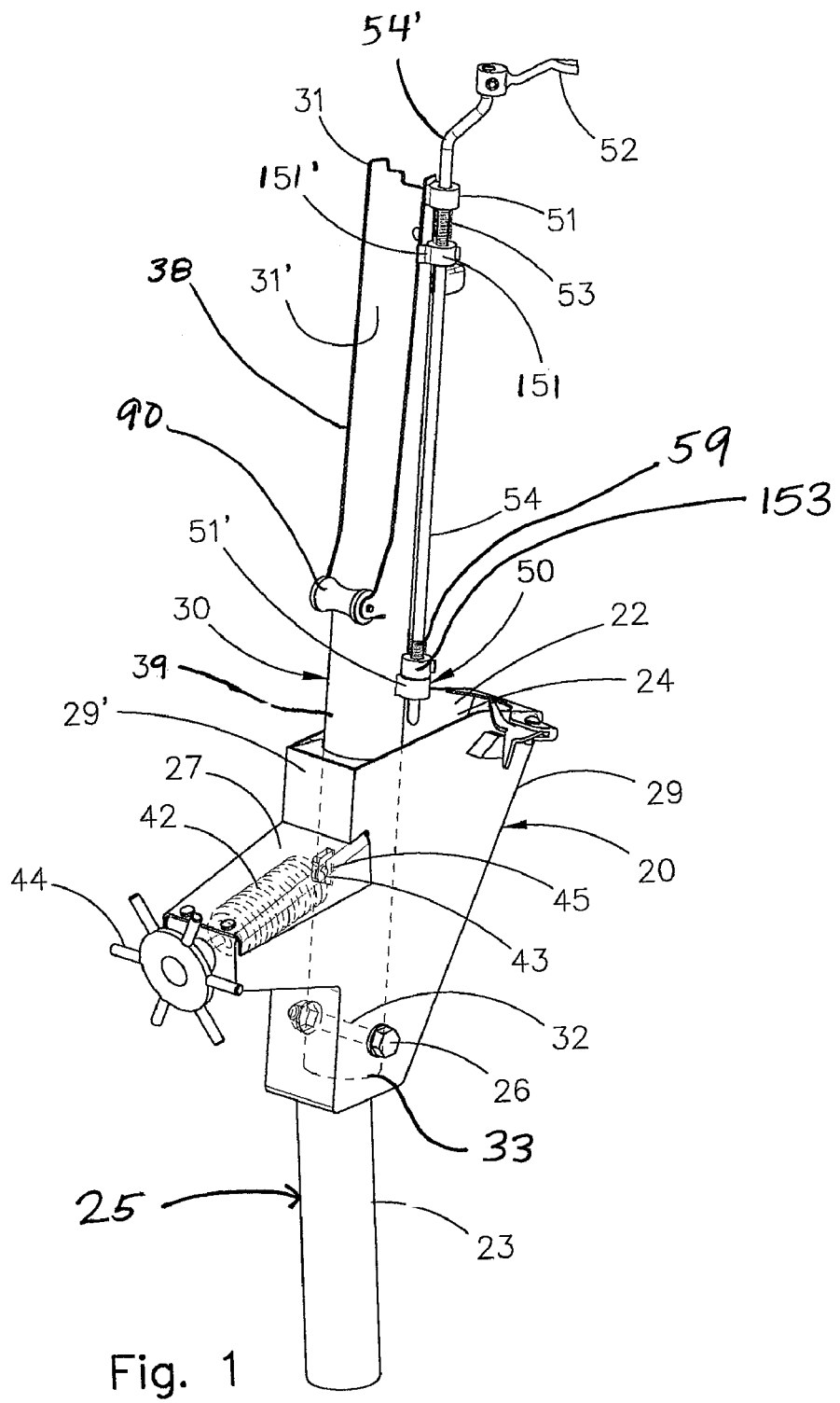
FIG. 1 is an isometric view of one of the embodiments of the present invention with rod holder assembly 30 in the frontmost position.
Figure 1A:
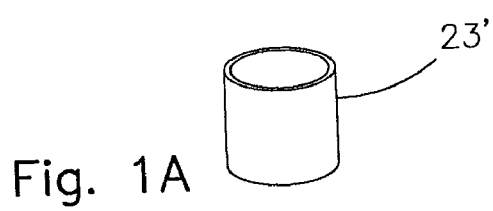
FIG. 1A represents an isometric view of a tubular holder 23' that is typically mounted to a fixed structure and receives tubular member 23.

Referring now to the drawings, where the present invention is generally referred to with numeral 10, it can be observed that it basically includes housing assembly 20 that receives a movable rod holder assembly 30 with spring assembly 40 biasing assembly 30 towards one extreme position (rearmost). Assembly 30 is releasably locked by locking holder assembly 50 in the other extreme position (frontmost). For this application, the front of holder 10 will be the side where the line is cast and the rear is the opposite side, where a user typically stands. Lock assembly 50 includes trigger 52 with fishing line L trained over it, and actuated (pivotally rotated) upon the application of a line force of a predetermined magnitude on the fishing line. Housing assembly 20 includes forward and rear walls, 29 and 29', respectively. Rear wall 29' provides a stop for the travel of holder assembly 30 to the rearmost position. Rubber cushions 80 are provided to absorb the impact.

Housing assembly 20, as seen in FIG. 1, has a substantially L-shape and includes an upper opening 22 defining the entrance to cavity 24 where rod holder assembly 30 is partially and pivotally housed. Pin 26 is mounted adjacent to the bottom 21 of housing assembly 20 and, in the embodiment shown in FIGS. 2 and 3, passes through through opening 32 adjacent to lower end 33 of pivotally mounted rod holder assembly 30. Housing 20 includes housing leg 27 that extends towards the rear. Housing leg 27 is hollow and houses therein spring assembly 40.

Figures 2, 2A:
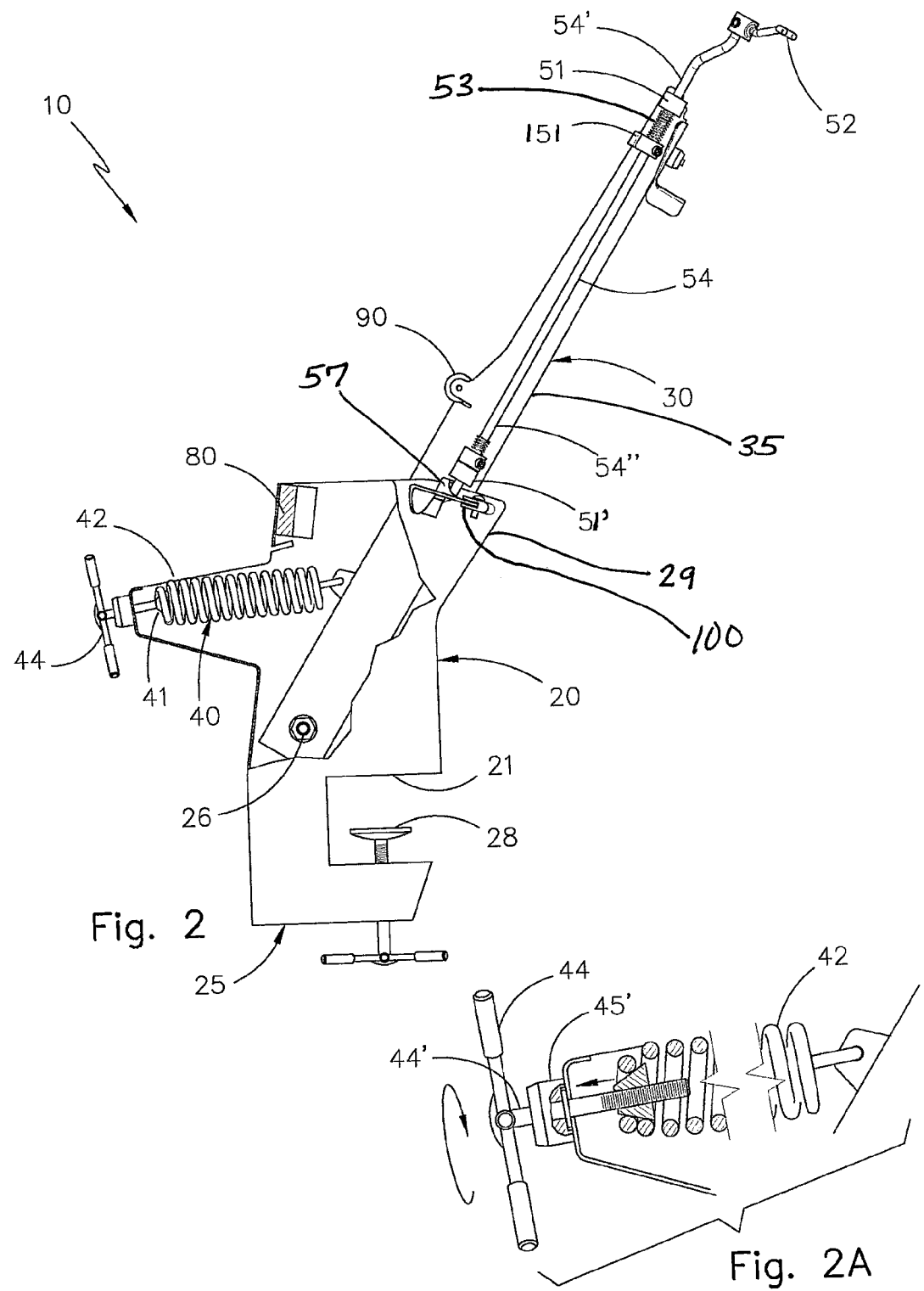
FIG. 2 shows a side elevational view of the embodiment shown in FIG. 1 with rod holder assembly 30 in the frontmost position. A portion of housing 20 has been removed to show the portion of assembly 30 inside housing assembly 20 and a different anchorage structure.
FIG. 2A is an enlarged side view of spring member 42 and tension adjustment knob 44.
Figure 3:
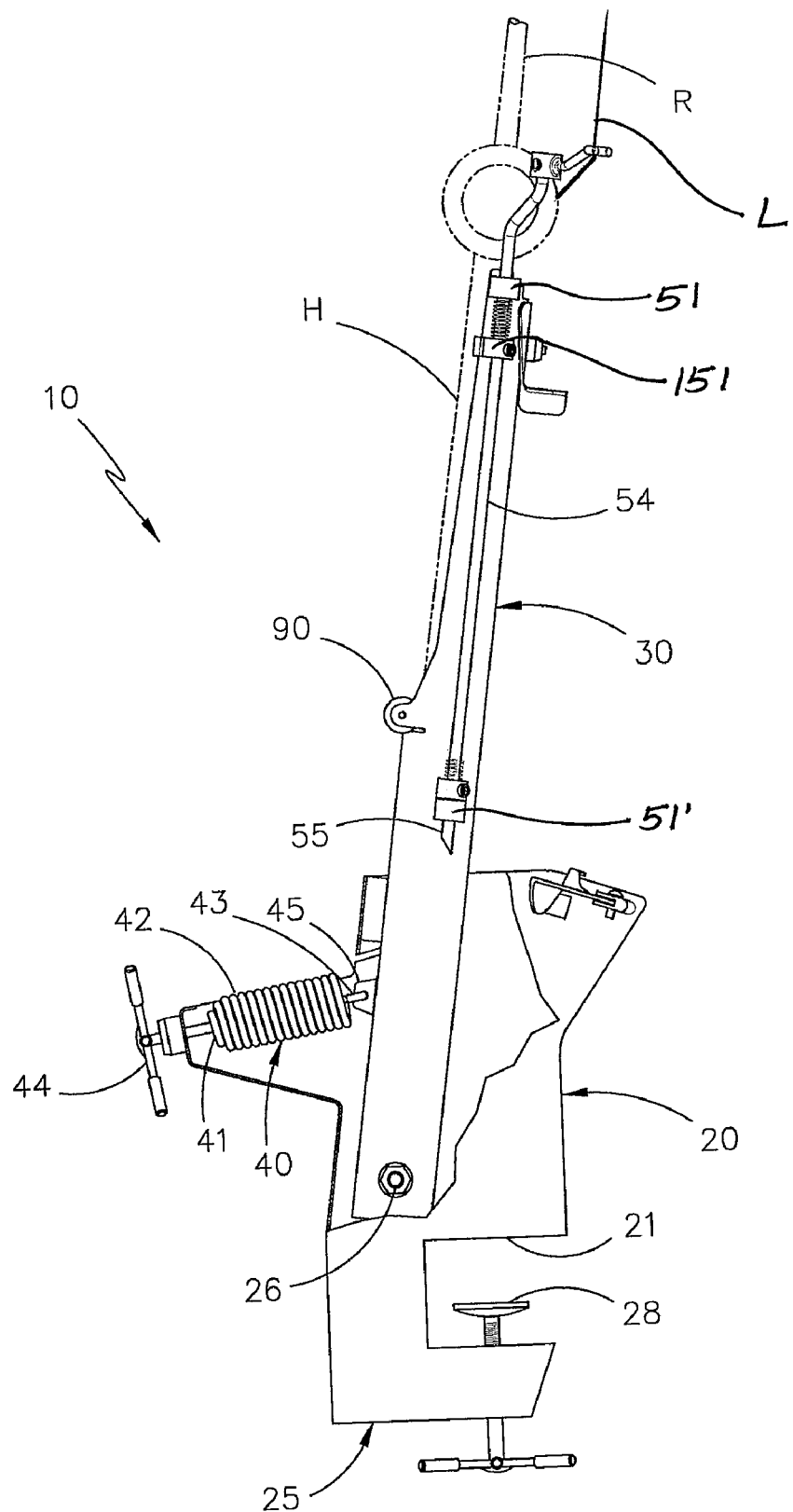
FIG. 3 illustrates a side elevational view of the embodiment shown in FIG. 2 after locking assembly has been released and rod holder assembly 30 is shown in the rearmost position. A portion of housing 20 has been removed to show assembly 30.

Anchorage assembly 25 is mounted to bottom 21 of housing 20. Assembly 25 can be implemented with different mechanisms. In FIG. 1, tubular member 23 is shown and it has cooperative dimensions to be received within tubular holder 23'. Tubular holder 23' is mounted to a fixed structure, typically the rail of a boat. In FIGS. 2 and 3, a clasp 28 is shown to implement anchorage assembly 25 permitting a user to mount assembly 25 to a fixed location.

Rod holder assembly 30 has a substantially tubular shape with upper and lower ends 31 and 33, respectively. Assembly 30 has a cooperative inner diameter to receive rod R. Cylindrical portion 39 of rod holder assembly 30 is mostly housed within cavity 24 and the semi-cylindrical portion 38 extends coaxially outwardly from portion 39. Through opening 32 is located substantially adjacent to lower end 33. Upper end 31 includes longitudinal cutout 31' cooperatively designed to expose the components of fishing rod R above handle H. Assembly 30 includes forward wall 35 which is brought in abutting relationship against forward wall 29 when holder 10 is set.

Spring assembly 40 is partially housed within housing leg 27 and includes spring member 42 and tension adjustment knob 44. The effective length of spring member 42 is varied (shorter to increase tension) by rotating spring tension adjusting knob 44, as best seen in FIG. 2A. Spring end 43 is connected to ear 45 rigidly mounted to rod holder assembly 30, to keep the latter biased towards the rearmost position of assembly 30. Spring end 41 is connected to ear 45' that includes an internal thread that mates with threaded shank 44' of knob 44. Other equivalent means can be used to provide an adjustable tensioning mechanism. Even if not readily adjustable, rubber bands can also be used.

Locking assembly 50 includes, in one of the embodiments, a rigid elongated member 54 with Y-shaped trigger 52 rigidly mounted thereon at one end 54' to transmit the rotation of trigger 52 caused by the pulling action of line L represented in FIG. 3. Elongated member 54 is axially movable parallel to rod holder assembly 30 between two axial extreme positions and two extreme rotation positions. Member 54 is kept within a predetermined axial movement by tubular members 51 and 51', both mounted to assembly 30. To define and limit the two extreme axial positions, tubular guide members 51 and 51' are rigidly mounted to assembly 30 and locking ring 151 is adjustably mounted to member 54 at a predetermined position. Spring 53 compresses and expands depending on the position of member 54. Spring 53 is constrained between guide tubular member 51 and locking ring 151. At rest, member 54 is urged towards end 33 by the expansion of spring 53. The expansion of spring 53 is limited by locking ring 153 which is removably mounted to member 54 at a predetermined cooperative position. Additionally, locking ring 151 includes stopper tab 151' that limits the rotation of member 59. Stopper 151' prevents or limits any further rotation in one direction when it comes in contact with assembly 30. Torsion spring 59 coacts with end 59" mounted to anchoring pin 56 of locking ring 153. End 59' coacts with the outer surface of assembly 30, as best seen in FIGS. 4 and 5.

Line L is trained over Y-shaped trigger 52 as shown in FIG. 3. The other end 54" of member 54 includes spring biased cam pin 55 that is shown in greater detail in FIGS. 4 and 5. Pin 55 has a chamfered termination 55' that cammingly cooperates with detent or stopper 57 that is rigidly mounted to housing 20. In the set position, the straight side of termination 55' cooperates with stopper 57 to withstand the pulling torque applied by spring 42 to assembly 30, as best seen in FIG. 4. Since pin 55 was only rotated about one quarter of a turn, only a portion of the straight side of termination 55' comes in contact with stopper 57. Nonetheless, this is sufficient to withstand the pulling action of spring 42. Once trigger 52 is pulled and rotates member 54, the chamfered side of termination 55' permits pin 55 to dislodge itself from stopper 57 cammingly forcing (by the much larger force of spring 42 as compared to spring 53) pin 55 upwardly away from end 33. Torsion spring 59 is coaxially mounted over member 54 with one end 59' extending radially outwardly to come in contact with assembly 30. The other end 59" is tied to anchoring pin 56. In this manner, the at rest expanded or distended position of spring 59 is shown in FIG. 4 and the compressed or retracted (temporarily until stopper 57 is cleared) position is shown in FIG. 5.

Other equivalent components can be utilized to sense a change in the tension of the fishing line to exert a rotational force to elongated member 54. For example, instead of a Y-shaped trigger member 52, it can have a V-shape. Other shapes are also adequate provided that member 54 rotates and the surface of pin 55 changes from a straight termination position (preventing dislodgment as shown in FIG. 4) to the chamfered termination (dislodgment shown in FIG. 5), upon rotation of pin 55, which will facilitate the cammingly dislodgement of pin 55 by overcoming the force of spring 59 with the large pulling action of spring member 42.

Security latch 100 is mounted to housing assembly 20, adjacent to upper opening 22. Latch 100 removably secures pin 50 in place to prevent its accidental dislodgment. Therefore, even if member 59 is set and trigger 52 actuated, latch 100 will prevent the movement of assembly 30 if set.

A user can mount several holders 10, and leave them unattended with fishing rods R that will be triggered when line L is pulled by a predetermined force. The adjustment of pin spring 59, or its replacement with other springs, will dictate the force that is required to rotate trigger 52. A very compressed pin spring 59 will require a greater pull of line L.

To facilitate the placing and retrieval of rod R inside assembly 30, roller 90 is mounted at the end of the cylindrical portion 39. Roller 90 provides a rotating surface that facilitates the placing and retrieval of rods minimizing damage to the latter.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing rod holder mechanism, comprising:
   A) housing means including an upper opening and a bottom, said housing means having a rear wall;
   B) holder means for removably holding a fishing rod with a fishing line cast away from said rod, said holder means being pivotally mounted within said housing means and movable between first and second extreme positions;
   C) first spring means for biasing said holder means towards said first extreme position; and
   D) releasable means for locking said holder means at said second extreme position, said means for locking includes rotably mounted elongated member that extends longitudinally alongside and parallel to said holder means, said elongated member having first and second ends and including a torsion spring to bias said elongated member at a first predetermined position and means for limiting the rotation of said elongated member to a second extreme predetermined position, and having trigger means for releasing said means for locking and said trigger means being responsive to a change in tension of a predetermined magnitude in said fishing line to cause said elongated member to rotate and further including a rotably mounted spring biased pin mounted to said second end, said pin being movable between a retracted position and a distended position with a second spring means for axially biasing said elongated member to said distended position, said pin having a chamfered termination with one portion being straight and the remaining of the termination being slanted, thereby cammingly moving said pin to said retracted position upon rotation by the pulling force of said first spring means causing a sudden pulling movement of said holder means from said second position to said first position.

2. The holder mechanism set forth in claim 1 further including:
   E) anchorage means for removably mounting said housing means to a fixed object.

3. The holder mechanism set forth in claim 2 wherein said housing includes a rear wall for stopping the travel of said holder means at said second extreme position.

4. The holder mechanism set forth in claim 3 further including means for limiting the rotation of said elongated member, including a locking ring mounted to said elongated member at a cooperating position and further including a stopper member that coacts with said holder means.

5. The holder mechanism set forth in claim 4 wherein said fishing line is cooperatively trained over said trigger means to actuate the latter upon the application of a force of a predetermined magnitude.

6. The holder mechanism set forth in claim 5 wherein said anchorage means includes a tubular member mounted to said bottom and a cooperating tubular holder for removably receiving said tubular member.

7. The holder mechanism set forth in claim 6 further including a cushion mounted on said rear wall.

8. The holder mechanism set forth in claim 7 wherein said trigger means includes a Y-shaped trigger that is rigidly mounted to said first end.

9. The holder mechanism set forth in claim 8 further including means for adjusting tension of said first spring means.

10. The holder mechanism set forth in claim 5 wherein said anchorage means includes a clasp mounted to said bottom.

11. The holder mechanism set forth in claim 10 further including a cushion mounted on said rear wall.

12. The holder mechanism set forth in claim 11 further including means for adjusting the tension of said first spring means.

* * * * *